Aug. 27, 1957   O. M. WHITTEN   2,804,178
POWER BRAKES WITH TRANSFER VALVE
Filed March 21, 1955   4 Sheets-Sheet 1

INVENTOR.
OWEN M. WHITTEN.

Aug. 27, 1957   O. M. WHITTEN   2,804,178
POWER BRAKES WITH TRANSFER VALVE
Filed March 21, 1955   4 Sheets-Sheet 2
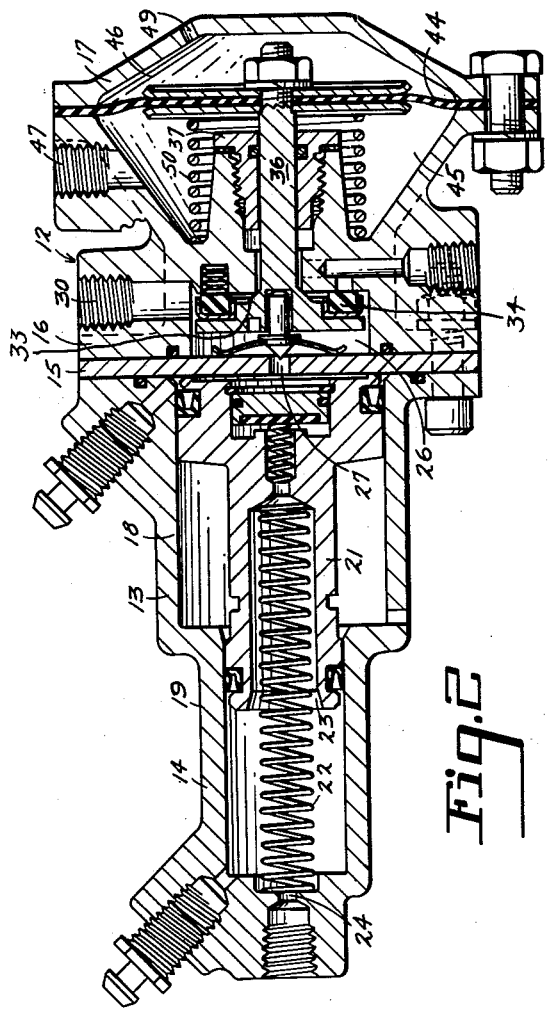
Fig. 2
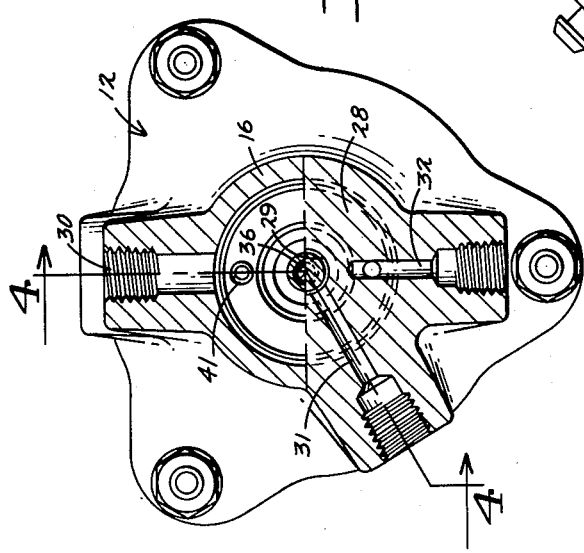
Fig. 1
Fig. 3
INVENTOR.
OWEN M. WHITTEN.

INVENTOR.
OWEN M. WHITTEN.

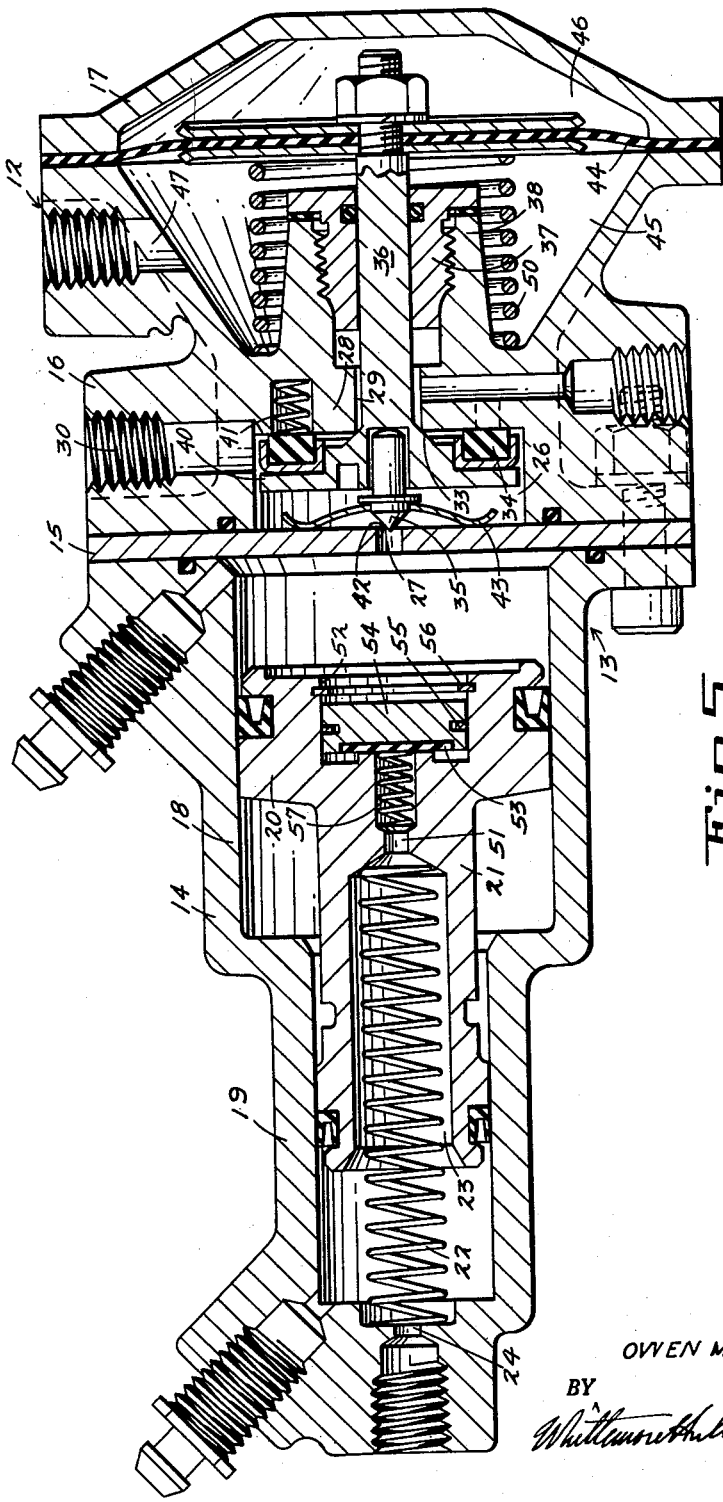

United States Patent Office 2,804,178
Patented Aug. 27, 1957

2,804,178

POWER BRAKES WITH TRANSFER VALVE

Owen M. Whitten, Mesquite, Tex., assignor to Kelsey-Hayes Company, a corporation of Delaware Application March 21, 1955, Serial No. 495,719

7 Claims. (Cl. 188—152)

The invention relates to hydraulic brake systems and refers more particularly to transfer valves for use in hydraulic brake systems having power operated booster devices which are adapted to be operated manually upon failure of power.

The invention has for one of its objects to provide a transfer valve which transfers the hydraulic pressure created by a booster device when operated by power and which increases the hydraulic pressure created by the booster device when operated manually upon failure of power and transfers the increased hydraulic pressure.

The invention has for another object to provide a transfer valve for use in a hydraulic brake system having a differential pressure operated booster device, the operation of the valve being controlled by one of the pressures for operating the booster device.

The invention has for another object to provide a transfer valve the operation of which is controlled by a pressure differing from atmospheric pressure and cooperating with atmospheric pressure to operate the booster device.

The invention has for a further object to provide a transfer valve which is operable upon failure of power to operate a portion only of the brakes of the brake system.

These and other objects of the invention will become apparent from the following description taken in connection with the accompanying drawings in which—

Figure 2 is a section of the transfer valve showing the parts in other positions;

Figure 3 is a cross section on the line 3—3 of Figure 1;

Figure 5 is a view similar to Figure 4 showing the parts in other positions.

Figure 1:
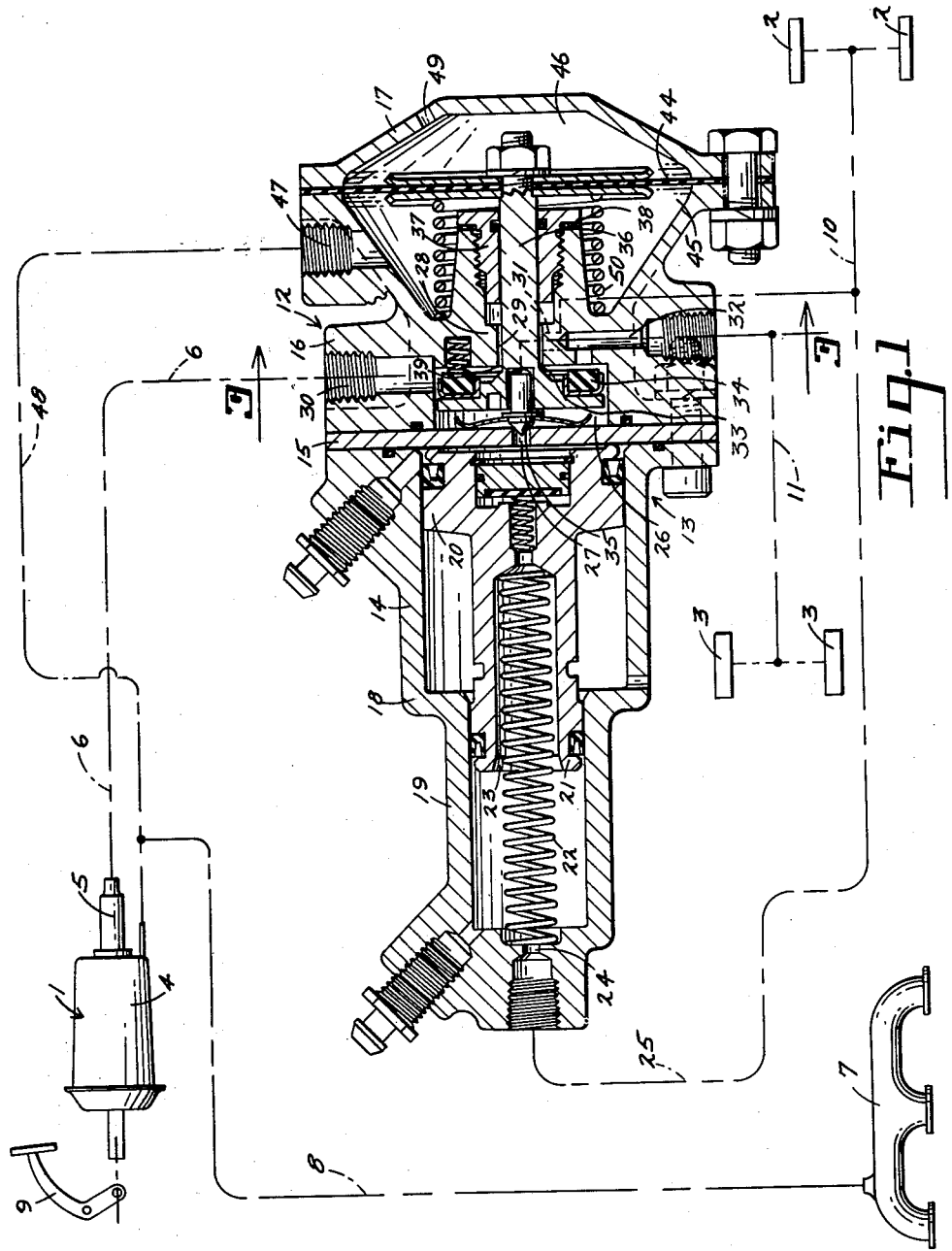
Figure 1 is a schematic view of a motor vehicle four wheel hydraulic brake system showing in section a transfer valve embodying the invention.

The transfer valve illustrated in the present instance is designed particularly for use in a motor vehicle four wheel hydraulic brake system between a differential fluid pressure operated booster device and the motors of the front and rear wheel brakes. As schematically shown in Figure 1, the brake system comprises the differential pressure operated booster device 1, the motors or wheel cylinders 2 for operating the rear wheel brakes and the motors or wheel cylinders 3 for operating the front wheel brakes. The booster device is of conventional construction comprising, in general, the booster 4 and the hydraulic cylinder 5, which latter is provided with an outlet port connected to the hydraulic line 6. The power piston of the booster is adapted to be moved forwardly to create pressure in the hydraulic cylinder by differential fluid pressure comprising sub-atmospheric pressure at the front side of the power piston and atmospheric pressure at the rear side of the power piston, the source of sub-atmospheric pressure being the intake manifold 7 of an internal combustion engine which is connected to the front end of the booster by the vacuum line 8. The operation of the booster is controlled by the foot pedal 9 which, upon being depressed, operates in a conventional manner through valving to cut off sub-atmospheric pressure to the rear side of the power piston and then admit atmospheric pressure to this side, the power piston being normally vacuum suspended. The wheel cylinders 2 and 3 are also of conventional construction and are adapted to receive hydraulic pressure through the hydraulic lines 10 and 11 respectively to operate the rear and front wheel brakes.

12 is the transfer valve located between the differential pressure operated booster device 1 and the rear and front wheel cylinders 2 and 3 respectively. The transfer valve has the housing 13 formed of the sections 14, 15, 16 and 17. The section 14 is a compound cylinder having the large cylinder 18 and the small cylinder 19 in which are slidable the large and small pistons 20 and 21 of a compound piston forming with the compound cylinder a compound cylinder device. The coil spring 22 abutting the end of the small cylinder 19 and the bottom of the bore 23 in the small piston 21 serves to normally hold the compound piston in retracted position. The small cylinder has the outlet port 24 in its end connected by the hydraulic line 25 to the hydraulic line 10. The section 15 is a partition plate between the large cylinder 18 and the section 16 and forming with the section 16 the valve chamber 26 which communicates with the adjacent end of the large cylinder 18 through the central outlet port 27 in the plate. The section 16 has the transverse wall 28 at the side of the valve chamber opposite the plate 15 and this wall is provided with the central opening 29 in axial alignment with the outlet port 27. The section 16 also has the inlet port 30 connected by the hydraulic line 6 to the hydraulic cylinder 5 and leading to the valve chamber and further has the outlet ports 31 and 32 which are connected by the hydraulic lines 10 and 11 respectively to the rear and front cylinders 2 and 3. The outlet ports 31 and 32 are angularly spaced and extend within the transverse wall 28 with the outlet port 31 leading from the opening 29 and the outlet port 32 leading directly from the valve chamber.

To control the flow of braking liquid displaced from the hydraulic cylinder 5, valve mechanism is provided within the valve chamber 26. This valve mechanism comprises the valves 33, 34 and 35 carried by the stem 36 which freely extends within the opening 29 and slidably engages the bearing 37 carried by the hub 38 of the transverse wall 28. The valve 33 is an annular beveled valve integral with the stem and engageable in one position with the seat 39 formed by the corner of the transverse wall bordering the opening at its valve chamber end. The valve 34 is an annular valve preferably formed of rubber and engageable in one position with the portion of the transverse wall 28 in which is located the part of the outlet port 32 opening into the valve chamber. This valve 34 is sleeved on the head 40 which is integral with the stem 36 and is positively urged toward the transverse wall by the head and resiliently urged away from the transverse wall by the coil springs 41 located in angularly spaced bores in the transverse wall. The valve 35 is a conical valve engaging an axial bore in the head 40 in axial alignment with the outlet port 27 and engageable with the seat 42 formed by the adjacent corner of the outlet port 27. The valve 35 is resiliently held in the head 40 by the bowed spring 43.

Figure 4:
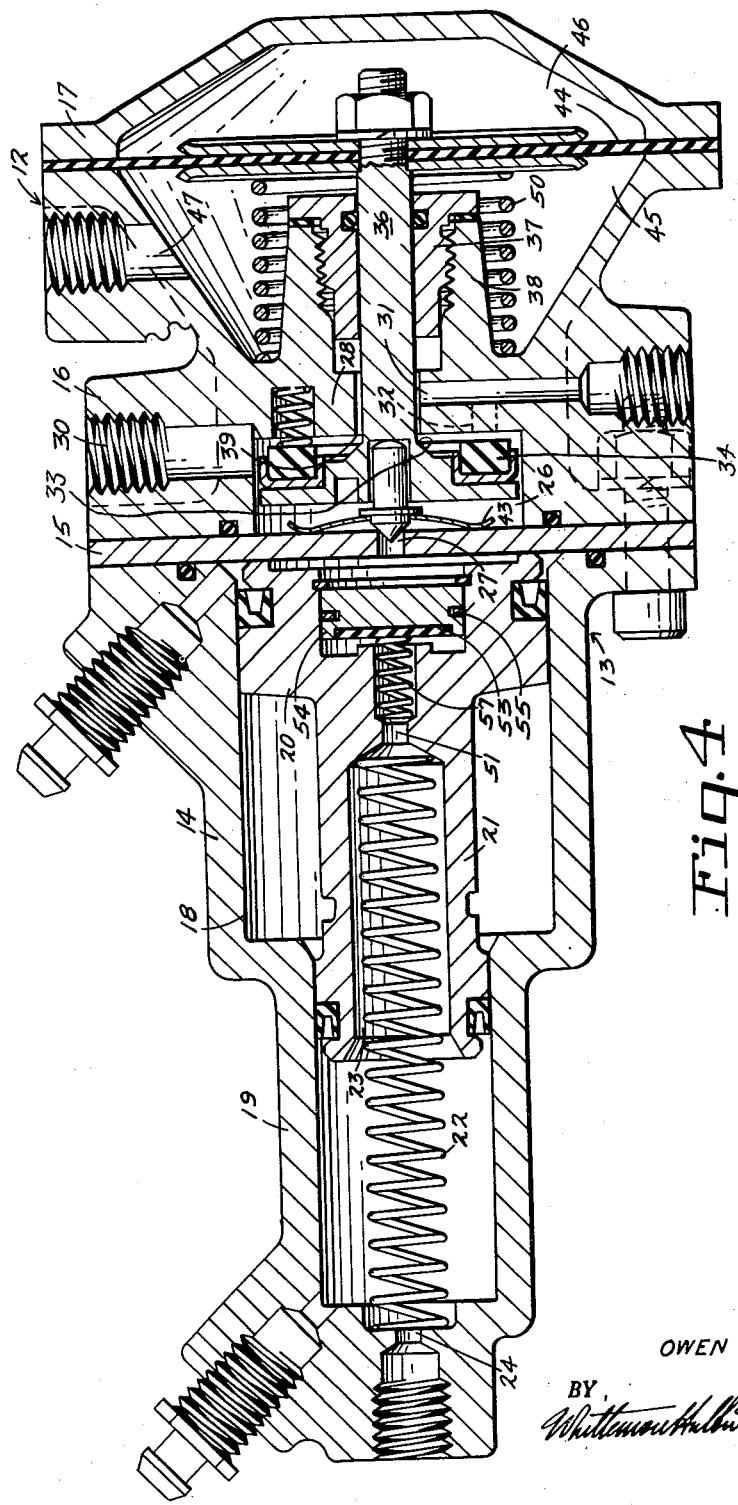
Figure 4 is a cross section on the line 4—4 of Figure 3.

For the purpose of operating the valve mechanism so that when the booster device 1 is operated by power the transfer valve 12 transfers the hydraulic pressure created by the booster device to both the rear and front wheel cylinders 2 and 3 and when the booster device is operated manually upon failure of power the transfer valve transfers hydraulic pressure to the rear wheel cylinders increased over that created by the booster device when manually operated, I have provided mechanism controlled by the vacuum used in creating power for the booster device. As shown, the stem 36 is secured to the flexible diaphragm 44 which is clamped between the sections 16 and 17 and forms with these sections the variable pressure chamber 45 and the constant pressure chamber 46. The variable pressure chamber is connected through the port 47 in the section 16 and the vacuum line 48 to the vacuum line 8. The section 17 is formed with the hole 49 for placing the constant pressure chamber in communication with the atmosphere. The coil spring 50 surrounding the hub 38 and abutting the transverse wall 28 and the diaphragm 44 urges the diaphragm outwardly away from the section 16. This coil spring is weaker than the differential fluid pressure acting on the diaphragm when the internal combustion engine of the motor vehicle is in operation so that the diaphragm occupies an inner position, as shown in Figures 1 and 4, holding the valve 35 closed and the valves 33 and 34 open. However, if the engine stops and air enters the variable pressure chamber 45 through the port 47, the diaphragm is moved outwardly away from the section 16 to an outer position shown in Figures 2 and 5 holding the valves 33 and 34 closed and the valve 35 open.

In operation, assuming the internal combustion engine of the motor vehicle to be running, the diaphragm 44 is held by the differential fluid pressure acting thereon in its inner position holding the valve 35 closed and the outlet valves 33 and 34 open, as shown in Figures 1 and 4. As a result when the foot pedal 9 is depressed and the booster device 1 is energized by differential fluid pressure and braking liquid is displaced from the hydraulic cylinder 5, braking liquid is also forced through the outlet ports 31 and 32 and both the rear and front brakes of the motor vehicle are applied.

However, if the internal combustion engine stops so that there is no vacuum or sub-atmospheric pressure for power operation of the booster device, the diaphragm 44 is moved to and held by the coil spring 50 in its outer position holding the valves 33 and 34 closed and the valve 35 open, as shown in Figures 2 and 5. As a result when the foot pedal is depressed to manually operate the booster device the pressure of the braking liquid displaced from the hydraulic cylinder 5 is lower than that displaced by power operation. However, this manually created braking liquid pressure is transmitted through the outlet port 27 to the compound cylinder device which magnifies or increases the pressure and delivers braking liquid at this magnified or increased pressure to the hydraulic line 25 so that the magnified or increased pressure is transmitted through the hydraulic line 10 to the wheel cylinders 2 of the rear wheel brakes only.

In order that compensation may take place between the rear wheel cylinders and the reservoir of the booster device when the foot pedal has been released after manual operation of the booster device, the compound piston is provided with a compensation passage. More particularly, the compound piston is provided with the central axially extending compensation port 51 opening into the bore 23 and having the enlarged cylindrical portion 52 in the end of the large piston 20 adjacent the plate 15. The port is adapted to be closed under the pressure of the braking liquid which is created manually when the engine is stopped by the circular valve 53 preferably formed of rubber and engageable and adapted to have sealing contact with the bottom of the enlarged portion 52. This valve is backed by the circular disk 54 which is provided with the transversely split piston ring 55 slidably engaging the cylindrical wall of the enlarged portion 52 and the gap between the ends of the piston ring has an area sufficient to accomplish the compensation when the valve is unseated or open and the disk is against the stop 56 under the influence of the coil spring 57.

With this construction it will be seen that when the foot pedal has been released after manual operation of the booster device, the compound piston is retracted by the coil spring 22 and the valve 53 is opened so that compensation may take place between the rear wheel cylinders and the reservoir of the booster device.

Figure 2 illustrates the positions of the parts making up the transfer valve when there is not sufficient manifold vacuum for power operation. This situation may occur when the vehicle, with which the braking system is employed, is standing idle. Under such circumstances, the hydraulic fluid in the wheel cylinders 2 for the rear wheel brakes communicates with the small cylinder 19 through the hydraulic lines 10 and 25. The compensation port 51 communicates with the small cylinder 19 through bore 23 in the small piston, and when the engine is idle this port is open, as shown in Figure 2. The open outlet port 27, which is in communication with the reservoir of the booster device, also communicates with the compensation port 51 by reason of the clearance provided between the transversely split piston ring 55 and the enlarged cylindrical portion 52. In other words, a restricted fluid passage is provided connecting opposite sides of the disc 54 by reason of the clearance that the split ring 55 affords. This communication across the split piston ring 55 thus provides communication between the rear wheel cylinders 2 and the reservoir of the booster device when there is a power failure or when there is not sufficient manifold vacuum for power operation of the brakes and the foot pedal is not being applied.

Accordingly, any pressure variations or leakage of hydraulic fluid in the rear wheels cylinders will be compensated for, as by a replenishment of hydraulic fluid lost by leakage, through the communication between the rear wheel cylinders and the reservoir of the booster device across the split piston ring 55. It will be appreciated, of course, that it is necessary to close the compensation port 51 when the brake pedal is applied in order for the compound cylinder device to transmit and increase pressure to the rear wheel cylinders.

What I claim as my invention is:

1. A transfer valve in combination with a hydraulic brake system between a differential pressure operated booster device and a brake operating motor comprising a housing having a valve chamber, an inlet port for communicating with the booster device, an outlet port for communicating with the motor and a second outlet port, valve mechanism in said valve chamber movable in response to failure of the differential pressure from a position closing said second outlet port to a position closing said first mentioned outlet port, and a compound cylinder device having a large cylinder communicating with said second outlet port and a small cylinder provided with a port for communicating with the motor and a compound piston having large and small pistons in said large and small cylinders respectively.

2. A transfer valve in combination with a hydraulic brake system between a differential fluid pressure operated booster device and a brake operating motor comprising a housing having a chamber, an inlet port for communicating with the booster device, an outlet port for communicating with the motor and a second outlet port, valve mechanism in said chamber movable from a position closing said second outlet port to a position closing said first mentioned outlet port, means including an element responsive to one of the fluid pressures for operating the booster device to operate said valve mechanism and means for receiving the hydraulic pressure transmitted to said second outlet port and for transmitting an increased hydraulic pressure to the motor.

3. A transfer valve in combination with a motor vehicle four wheel hydraulic brake system between a differential pressure operated booster device and separate front and rear wheel brake operating motors comprising a housing having a valve chamber, an inlet port for communicating with the booster device, separate outlet ports for communicating respectively with the front and rear wheel brake motors and another outlet port, valve means in said valve chamber movable in response to failure of the differential pressure from a position closing said last mentioned outlet port to a position closing said separate outlet ports, a compound cylinder having a large cylinder communicating with said last mentioned outlet port and a small cylinder provided with a port for communicating with one of said front and rear wheel brake motors and a compound piston having large and small pistons in said large and small cylinders respectively.

4. A transfer valve in combination with a hydraulic brake system between a differential pressure operated booster device and a brake operating motor comprising a housing having a valve chamber, an inlet port leading to said chamber for communicating with the booster device, an outlet port leading from said chamber for communicating with the motor and a second outlet port leading from said chamber and a compound cylinder provided with a large cylinder communicating with said second outlet port and a small cylinder for communicating with the motor, valve mechanism in said chamber, a compound piston having large and small pistons respectively in said large and small cylinders, and means operative on failure of a pressure for operating the booster device for moving said valve mechanism from a position closing said second outlet port to a position closing said first mentioned outlet port.

5. A transfer valve in combination with a hydraulic brake system having a manual and differential pressure operated booster device and separate brake operating motors comprising a housing having a valve chamber, an inlet port leading to said chamber for communicating with the booster device, separate outlet ports leading from said chamber for communicating with the separate motors and another outlet port leading from said chamber, valve mechanism for controlling said outlet ports, said valve mechanism providing for the transfer through said separate outlet ports of hydraulic pressure created by the booster device when operated by differential pressure and operating upon failure of the differential pressure to provide for the transfer through said other outlet port of the hydraulic pressure created by the booster device when manually operated, and means operated by the hydraulic pressure entering through said other outlet port for transmitting an increased hydraulic pressure to one of the motors.

6. A transfer valve in combination with a hydraulic brake system between a differential pressure operated booster device and a brake operating motor comprising a housing having a valve chamber, an inlet port for communicating with the booster device, an outlet port for communicating with the motor and a second outlet port, valve mechanism in said valve chamber movable in response to failure of the differential pressure from a position closing said second outlet port to a position closing said first-mentioned outlet port, and means for receiving the hydraulic pressure transmitted to said second outlet port and for transmitting an increased hydraulic pressure to the motor.

7. A transfer valve for use in a hydraulic brake system between a differential fluid pressure operated booster device and a brake operating motor comprising a housing having a chamber, an inlet port for communicating with the booster device, an outlet port for communicating with the motor and a second outlet port, valve mechanism in said chamber movable from a position closing said second outlet port to a position closing said first-mentioned outlet port, and means for receiving the hydraulic fluid pressure transmitted to said second port and for transmitting an increased hydraulic pressure to the motor.

References Cited in the file of this patent
UNITED STATES PATENTS

| | | |
|---|---|---|
| 2,323,406 | Milhaupt | July 6, 1943 |
| 2,526,968 | Pontius | Oct. 24, 1950 |